US009938659B2

(12) United States Patent
Foss et al.

(10) Patent No.: US 9,938,659 B2
(45) Date of Patent: Apr. 10, 2018

(54) APPARATUS AND METHOD OF MAKING A NONWOVEN CEILING TILE AND WALL PANEL

(71) Applicant: Nonwoven Network LLC, Naples, FL (US)

(72) Inventors: Stephen W. Foss, Naples, FL (US); Jean-Marie Turra, Greer, SC (US)

(73) Assignee: Nonwoven Network LLC, Naples, FL (US)

( * ) Notice: Subject to any disclaimer, the term of this patent is extended or adjusted under 35 U.S.C. 154(b) by 0 days.

(21) Appl. No.: 15/192,303

(22) Filed: Jun. 24, 2016

(65) Prior Publication Data

US 2016/0376748 A1    Dec. 29, 2016

Related U.S. Application Data

(60) Provisional application No. 62/185,575, filed on Jun. 27, 2015.

(51) Int. Cl.
*D06N 7/00* (2006.01)
*B32B 5/26* (2006.01)
(Continued)

(52) U.S. Cl.
CPC .......... *D06N 7/0002* (2013.01); *B32B 5/022* (2013.01); *B32B 5/06* (2013.01); *B32B 5/08* (2013.01);
(Continued)

(58) Field of Classification Search
CPC .......... D06N 7/0002; D06N 2209/067; D06N 2209/02; E04B 9/04; E04B 1/942;
(Continued)

(56) References Cited

U.S. PATENT DOCUMENTS 3,607,602 A   9/1971 Greskiewicz
3,919,444 A   11/1975 Shayman
(Continued)

FOREIGN PATENT DOCUMENTS

DE   19808425 A1   9/1999
EP    1013414 A2   6/2000
(Continued)

OTHER PUBLICATIONS

Nonwoven Network, "Spotlight", retrieved from <http://www.nonwovennetwork.com/docs/spotlight.htm>, printed on Feb. 25, 2015.
(Continued)

*Primary Examiner* — Nathan L Van Sell
(74) *Attorney, Agent, or Firm* — Lerner, David, Littenberg, Krumholz & Mentlik, LLP

(57) ABSTRACT

A nonwoven ceiling tile or wall panel with noise absorption properties utilizes unique acoustical absorbing fibers. During manufacturing, binder fibers melt between interstitial spaces to fill spaces and create impedance to air flow and sound flow through the fibers. Various shapes and/or sizes of fibers may also be utilized to further impedance of air and sound through the ceiling tile or panel. The ceiling tiles and panels are made from 100% organic fibers that are either virgin or recycled material. The material is structurally self-supporting eliminating need for structural additives or structural design features. Fire and smoke retardants are incorporated into the fibers. Antimicrobial and anti-stain additives may also be used in the fibers. The material is 100% polyester fibers (PET and PETG). The material is printable using sublistatic printing or transfer printing process. The ceiling tiles and panels are light weight and moldable in a wide range of designs.

19 Claims, 6 Drawing Sheets

(51) Int. Cl.
| | |
|---|---|
| *B32B 5/06* | (2006.01) |
| *B32B 5/02* | (2006.01) |
| *D04H 1/541* | (2012.01) |
| *D04H 1/55* | (2012.01) |
| *E04B 1/94* | (2006.01) |
| *E04B 9/04* | (2006.01) |
| *E04B 9/00* | (2006.01) |
| *B32B 5/08* | (2006.01) |

(52) U.S. Cl.
CPC .............. *B32B 5/26* (2013.01); *D04H 1/541* (2013.01); *D04H 1/55* (2013.01); *E04B 1/942* (2013.01); *E04B 9/001* (2013.01); *E04B 9/04* (2013.01); *E04B 9/0464* (2013.01); *B32B 2262/0246* (2013.01); *B32B 2262/0253* (2013.01); *B32B 2262/0261* (2013.01); *B32B 2262/0276* (2013.01); *B32B 2262/0284* (2013.01); *B32B 2262/065* (2013.01); *B32B 2262/12* (2013.01); *B32B 2262/14* (2013.01); *B32B 2307/102* (2013.01); *B32B 2307/3065* (2013.01); *B32B 2307/702* (2013.01); *B32B 2307/718* (2013.01); *B32B 2307/7145* (2013.01); *B32B 2307/732* (2013.01); *B32B 2307/75* (2013.01); *B32B 2419/04* (2013.01); *B32B 2607/00* (2013.01); *D06N 2209/02* (2013.01); *D06N 2209/067* (2013.01)

(58) Field of Classification Search
CPC ......... E04B 9/0464; E04B 9/001; B32B 5/26; B32B 5/06; B32B 5/022; B32B 5/08; B32B 2262/0246; B32B 2262/0276; B32B 2262/0261; B32B 2262/0253; B32B 2419/04; B32B 2607/00; B32B 2262/14; B32B 2262/12; B32B 2262/065; B32B 2262/0284; B32B 2307/732; B32B 2307/718; B32B 2307/7145; B32B 2307/702; B32B 2307/3065; B32B 2307/102; B32B 2307/75; D04H 1/541; D04H 1/55
See application file for complete search history.

(56) References Cited

U.S. PATENT DOCUMENTS

| | | | |
|---|---|---|---|
| 5,000,992 A | 3/1991 | Kelch | |
| 5,545,441 A | 8/1996 | Land | |
| 5,558,710 A | 9/1996 | Baig | |
| 5,567,511 A | 10/1996 | Shih et al. | |
| 6,475,315 B1* | 11/2002 | Kean | D04H 1/72 156/296 |
| 6,541,105 B1 | 4/2003 | Park | |
| 6,855,753 B1 | 2/2005 | Englert | |
| 6,877,585 B2 | 4/2005 | Tinianov | |
| 8,173,233 B2 | 5/2012 | Rogers et al. | |
| 8,337,976 B2 | 12/2012 | Mayers et al. | |
| 8,496,088 B2 | 7/2013 | Kitchen et al. | |
| 9,234,348 B1 | 1/2016 | Lehane et al. | |
| 2004/0231915 A1 | 11/2004 | Thompson et al. | |
| 2005/0003728 A1 | 1/2005 | Foss | |
| 2005/0136100 A1 | 6/2005 | Foss | |
| 2006/0065482 A1 | 3/2006 | Schmidft et al. | |
| 2006/0137799 A1 | 6/2006 | Haque et al. | |
| 2006/0141884 A1 | 6/2006 | Haque | |
| 2006/0289231 A1 | 12/2006 | Priebe et al. | |
| 2008/0067002 A1 | 3/2008 | Pfaffelhuber et al. | |
| 2009/0242325 A1 | 10/2009 | Dellinger et al. | |
| 2009/0246492 A1* | 10/2009 | Bishop | A01G 13/0237 428/219 |
| 2009/0253323 A1* | 10/2009 | Mueller | B32B 5/08 442/150 |
| 2011/0114414 A1 | 5/2011 | Bliton et al. | |
| 2011/0151738 A1* | 6/2011 | Moore | D04H 1/4291 442/334 |
| 2011/0293911 A1* | 12/2011 | Coates | B32B 5/26 428/220 |
| 2012/0315225 A1* | 12/2012 | Porbeni | A61L 15/26 424/49 |
| 2013/0115837 A1* | 5/2013 | Kitchen | D04H 3/016 442/60 |
| 2013/0288556 A1 | 10/2013 | Moore et al. | |
| 2014/0079938 A1 | 3/2014 | Perick et al. | |
| 2014/0242309 A1 | 8/2014 | Foss et al. | |

FOREIGN PATENT DOCUMENTS

| | | |
|---|---|---|
| EP | 2781636 A1 | 9/2014 |
| EP | 2860294 A1 | 4/2015 |
| WO | 0151546 A1 | 7/2001 |
| WO | 0209089 | 1/2002 |
| WO | 2007061423 A2 | 5/2007 |
| WO | 2009088648 A1 | 7/2009 |

OTHER PUBLICATIONS

Tascan, "Effects of Fiber Denier, Fiber Cross-Sectional Shape and Fabric Density on Acoustical Behavior of Vertically Lapped Nonwoven Fabrics", Journal of Engineered Fibers and Fabrics, vol. 3, Issue 2, 2008, pp. 32-38.

Extended European Search Report for EP Application No. 15162188.5 dated Mar. 15, 2016.

Partial European Search Report for EP Application No. 15162186.9 dated Mar. 8, 2016.

Shahani, F., Soltani, P., et al., The Analysis of Acoustic Characteristics and Sound Absorption Coefficient of Needle Punched Nonwoven Fabrics, Journal of Engineered Fibers and Fabrics, vol. 9, Issue 2—2014.

Extended European Search Report for Application No. EP15162186 dated Jul. 21, 2016.

Extended European Search Report for Application No. 15192094.9 dated Jul. 19, 2016.

Extended European Search Report for Application No. 16176357.8 dated Nov. 30, 2016.

* cited by examiner

Ceiling Tile Design

Ceiling Tile Design with Logo

Figure 4.
Fibers Shapes
Round
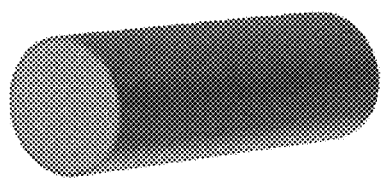
Star
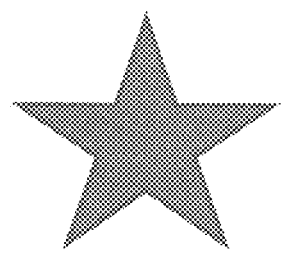
Delta
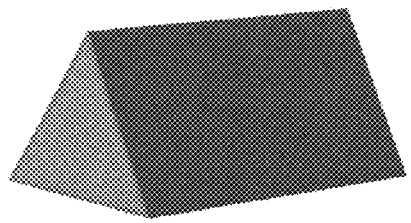
Triangle
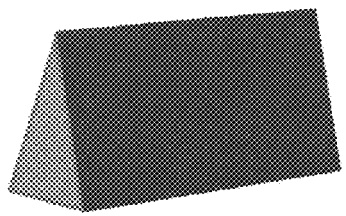
Hollow
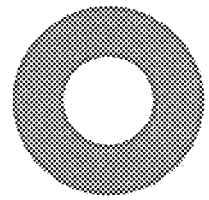
Mock-Hollow of C
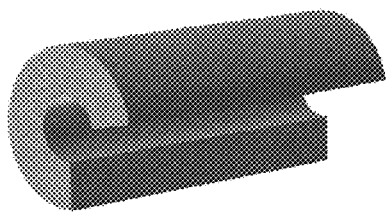

APPARATUS AND METHOD OF MAKING A NONWOVEN CEILING TILE AND WALL PANEL

CROSS-REFERENCE TO RELATED APPLICATION

The present application claims the benefit of the filing date of U.S. Provisional Patent Application No. 62/185,575, filed Jun. 27, 2015, the disclosure of which is hereby incorporated herein by reference.

BACKGROUND OF THE INVENTION

In the construction industry many structures are important to the overall structural integrity and soundness of a building or built structure. Typically the ceiling is a hard, sound-reflecting material such as wood, plaster or concrete. Noises and other sounds spread throughout the room with little or no noise reduction; and noise levels build up in unmodified ceilings. Attempts to minimize such build-up noise include the practice to make ceilings with sound absorbing material such as acoustical tiles that are typically flat squares of porous material dimensioned to fit within the openings of a standard suspended ceiling or wall panel. Such noise reducing tiles are particularly effective for trapping and absorbing medium wavelength sound between about 1 kilohertz and 2 kilohertz, a very narrow band of the audible sound spectrum but typically not a broader noise band.

While conventional planar ceiling systems work well in limiting medium wavelengths of the audible range, they leave much to be desired where there is substantial sound in the range between 4 kilohertz and 8 kilohertz and 100 hertz to 800 hertz or outside the range of 500 to 2000 hertz. Longer wavelength sounds encountered in many office and industrial settings are not easily trapped or absorbed. Portions of these non-absorbed sound waves easily penetrate the planar ceiling or wall in a coherent wave front. Thus, traditional noise reduction ceiling tiles and wall panels have very poor performance in noise reduction factors.

Anechoic type tiles have been designed in the past with relatively complex geometries for absorbing more of a spectrum of sound. These types of tiles, however, are not generally suitable for economical manufacture, installation or use in commercial applications. Further these types of tiles are not suitable for retrofit into existing acoustical ceiling or wall surfaces and would be undesirable in occupied buildings.

Ceiling tiles have been made from mineral fibers and cellulosic fibers using a slurry process which involves a high percentage of water in the process that must be evaporated to form the tile. Further, there is a significant amount of waste water from the process that must be cleaned up and may not be reused.

Traditional ceiling tiles have poor noise reduction factors and typically have noise reduction in the range of 500 to 2,000 hz.

Traditional ceiling tiles are heavy and dense to be able span grids of 2'×2' or 2'×4'. Further, they are subject to water staining from leaky roofs or water drips. Further most ceiling tiles suffer from mold and mildew, as well as bacterial growth.

Traditional ceiling tiles are not readily recycled back into themselves. Generally, they cannot achieve 90% recycled content or greater.

In addition most common building materials such as wood, metal and masonry have hard surfaces and thus reflect sound. Further some materials have coatings such as latex to seal the material. Such materials are considered sound "reflective" barriers. When sound strikes the surface of a reflective barrier, some energy is transmitted through the ceiling tile or panel but the bulk is reflected back in the general direction of the noise source. Depending upon the roughness and shape of the surface, and the wavelength of the sound, the sound may be fractured in different directions. This is not desirable for several reasons including having sound reflected back to the source that may cause vibrations in the structure holding the ceiling tiles or panels. As with interior building materials, the use of sound absorptive is preferable.

Therefore there exists a need for an acoustical ceiling tile or panel that will provide improved noise reduction, be sound absorptive rather than sound reflective and be manufactured in a process that utilized very little water, are made from recycled raw materials, can be recycled back into new tiles, are stain resistant, are anti-microbial resistant, and are lighter weight.

Thus there still exists a need for an acoustic absorber that is thermo-formable or otherwise moldable, light weight, resistant to water penetration and other environmental factors, flame resistance, and has a high RAYLS number.

SUMMARY OF THE INVENTION

The invention provides for an acoustical ceiling tile or wall panel that has improved noise reduction, and is manufactured in a process that utilized very little water. The ceiling tiles or wall panels are made from virgin or recycled raw materials, and can be recycled back into new tiles or wall panels. The ceiling tiles or panels are stain resistant, anti-microbial resistant, and are lighter weight. The acoustical ceiling tiles or wall panels are thermo-formable or otherwise moldable, light weight, resistant to water penetration and other environmental factors, flame resistance, smoke suppressive and have a high RAYLS number. The ceiling tiles may be the same dimensional size as standard ceiling tiles so no additional cutting is required during installation. Further the ceiling tiles offer the improved acoustical properties as well as lighter weight, flame resistance/smoke resistance, stain resistances and mold/mildew resistance. In addition all ceiling tiles and wall panels are 100% recyclable and if cutting is needed during installation provides a no dust or low dust environment for installers. Depending on the embodiment the wall panels may be free hanging acoustical wall panels. Other types of wall panels may also be utilized in the invention.

The ceiling tiles or wall panels utilize a flame resistance additive into a polymer such as a polyester, including but not limited to polyethylene terephalate (PET), polyethylene terephalate glycol modified (PETG) and other polyesters and similar polymers. Such flame resistance additives may include for example, polyphosphonates, such as found in the Americhem 33558-F1 (CAS #68664-06-2). This flame resistance family of compounds was found very successful for low smoke and flame spread. Certain polyphosphonates are used in PET for children's sleepwear and are considered safe for personnel use and the environment. Other flame resistant additives such as organophosphates, phosphonates, antimony trioxide, and the like may also be used. There is a wide class of organohalogen compounds that are effective but they may carry safety and health concerns.

By incorporating a flame resistance additive into a molten polymer of the high melt fiber, a highly flame resistant moldable composite can be formed that will meet newer, more stringent flame resistance. In the alternative the flame and/or smoke suppressant may be topically applied after the fibers are formed either by spray coating or other topical methods. In addition the fibers by be infused with the flame retardant additive and/or smoke suppressant additive and also sprayed with one or both additives for additional protection. Additionally the flame retardant and smoke suppressant may be different additives or the same additive. For the infusion process, the fiber may be extruded below 300° C. and possibly below 290° C.

The method of manufacturing the nonwoven material of the present invention requires two types of fibers, a first fiber type having a low melt fiber and a second fiber type having a higher melt fiber. The first fiber type has a melt temperature above 110 C (230 F) and acts as a binder fiber for binding the plurality of nonwoven synthetic fibers. Depending on the embodiment the first fiber type melts into the interstitial spaces formed by the second fiber type. Alternatively, the first and second fiber type creates interstitial spaces and some of the first fiber type fibers melt into the interstitial spaces. The filled interstitial spaces reduce air flow and reduce sound waves from passing through the nonwoven fabric that forms the acoustical ceiling tile or panel.

If the flame retardant is not a coating and is instead chemically bonded to the fiber during the compounding process it may be added to either the first fiber type or the second fiber type or both. The first fiber type acts as a binder fiber since it has a lower melting point than the second fiber type. The first fiber type or binder fiber may be polyethylene glycol modified (PETG) cyclohexanedimethanol (CHDM) or the like and may be compounded with a flame retardant and/or smoke suppressant. The second fiber type may be polyethylene terephalate (PET); Nylon 6; Nylon 66; Polylactic acid (PLA); Acrylic; Polypropylene; Polypropylene blended with at least one of Isophthalic modified PET, Co-Polylactic Acid (CoPLA), and polyethylene; and any combination thereof. The PETG and PET materials are a stiff material and give strong physical properties needed for ceiling tile or panel structural use without any special design concerns unlike other polymers like polyurethane and other Styrofoam (expanded polystyrene) like materials. The level of the PETG percentage controls the stiffness and the air flow resistance.

The flame retardant if used with the binder fiber is heat sensitive so compounding the flame retardant into the binder fiber is done at a very low heat level and with low heat history. For a polyphosphate based flame retardant, concentrated polyphosphate degrades around 285° C. Preferably the binder fiber is compound extruded at 280° C. or lower with no heat history. The extrusion process is given a low draw ratio of approximately 2-2.5 to prevent crystallinity from occurring. By creating an amorphous binder fiber, the binder fiber will melt at a lower temperature creating a melted filling within the interstitial spaces of the nonwoven material further blocking air and creating resistance for sound.

Various cross-sectional shapes and lengths of the first and second types of fibers may be utilized to further the acoustical qualities of the ceiling tiles or panels. The more tortuous path created within and by the filled interstitial spaces formed by the fibers the less air flow through the nonwoven fabric and hence the more sound absorption. Sound absorption is preferred over sound reflective materials. The ceiling tiles and wall panels have many benefits over prior ceiling tiles and wall panels that provide acoustical absorption. The ceiling tiles and wall panels of the present invention provide higher sound absorption in the range of between 4 kilohertz and 8 kilohertz and 100 hertz to 800 hertz or outside the range of 500 to 2000 hertz. The ceiling tiles and wall panels of the present invention are lighter weight than standard tiles, require no special design features for structural integrity unlike other acoustic materials, are stain resistant, anti-microbial, flame retardant and smoke suppressive. The ceiling tiles and wall panels of the present invention are manufactured using very little water and may be made from recycled raw materials that can be recycled (90% recycled content or greater) back into new ceiling tiles and wall panels unlike traditional ceiling tiles or wall panels.

BRIEF DESCRIPTION OF THE DRAWINGS

FIG. 4 is perspective and cross-sectional views of fibers with different shapes that may be utilized in the formation of the ceiling tile in FIG. 1.

DETAILED DESCRIPTION

Figure 1:
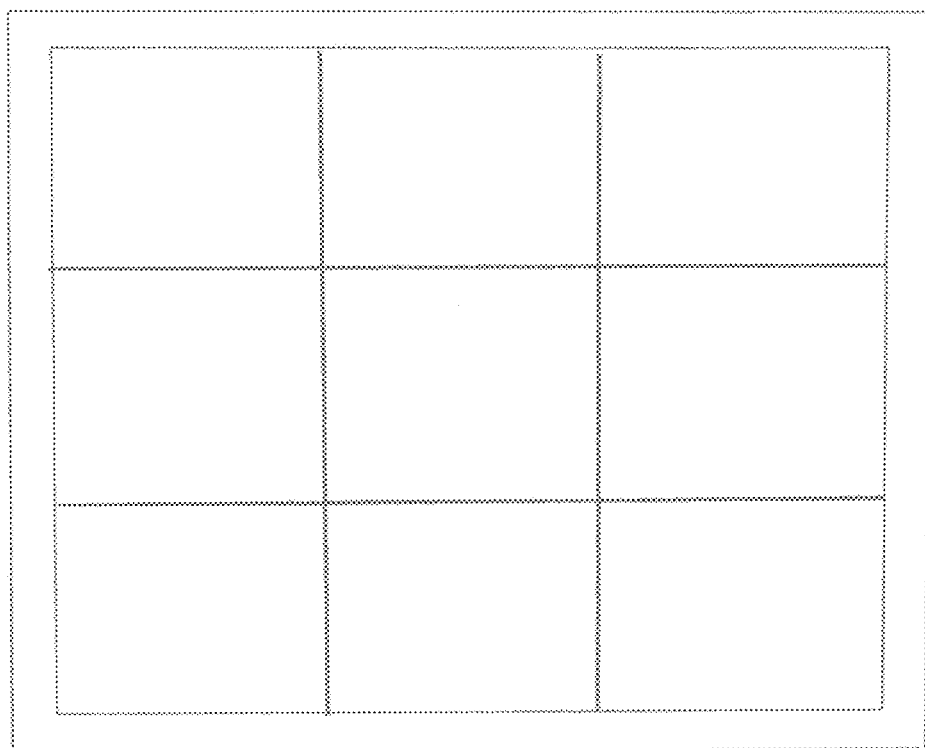
FIG. 1 is an example of a molded or embossed pattern of a ceiling tile in accordance with the present disclosure.

In experimental trials, initial work was done using a blend of polyester fibers.

Example 1

Initial work was done using a blend of Polyester fibers below:

| | |
|---|---|
| –6 denier × 76 mm White PET fibers | 65% |
| Huvis Type 131 4d × 51 mm 110° C. BiCo | 35% |

This was tested for FR using the E84 fire test and found to have heavy smoke and burn rapidly. Acoustic values were marginal.

Example 2

Many additional blends were tried applying a topical spray to the fiber during blending with the following formula:

| | |
|---|---|
| Lurol L624 | 0.25% on Fiber |
| Lurol 14951 | 0.90% on fiber by weight |

This improved the Flame resistance but smoke was still an issue. Acoustic values were marginal.

Example 3

The next blend tried was:

| | |
|---|---|
| −6 denier × 76 mm White PET fibers | 64% |
| −15 denier × 76 mm Brown PET fibers | 1% |
| −4 denier × 51 mm Clear PETG fibers | 35% |

A topical spray with the following formula was applied during blending:

| | |
|---|---|
| Lurol L624 | 0.25% on Fiber |
| Lurol 14951 | 0.90% on fiber by weight |

This resulted in much improved stiffness, Class A rating on the E84 test, and a Noise Reduction Coefficient of 70%. It showed that there was a need to improve the flame resistance more and to improve the Noise Reduction.

Example 4

Polyester fibers were produced by using 100% recycled clear PET (polyethylene terephalate) bottle flake that was dried and crystallized. The flake was blended with Americhem 33558-F1. 5% concentrate polyphosphinate at a rate of 5% by weight in the fiber. The Formula was:

| | |
|---|---|
| Clear PET Flake: | 94.5% |
| Americhem 33558-F1 | 5% |
| Titanium Dioxide | 0.5% |

This blended compound was fed into a 8" 24:1 extruded. Melt temperature was maintained at 290° C. or less. The molten polymers were metered by gear pumps and fed into 1500 hole spinnerettes. The fibers were formed and accumulated into tow cans. The tow was then drawn at a ratio of 3.5 to land crimped to 8 crimps per inch. The fiber was drawn to 4, 6, and 15 denier at a length of 76 mm.

Recycled PETG (polyethylene gycol) (typically Eastman GN071 clear) flake was extruded in a similar manner and produced 4 denier×2" fibers.

Example 5

The fibers in Example 4 were blended in the following ratio:

| | |
|---|---|
| −4 denier 76 mm FR PET | 30% |
| −6 denier 76 mm FR PET | 35% |
| −15 denier × 51 mm FR PET | 5% |
| −4 denier × 51 mm PETG | 30% |

During blending, additional fiber finishes were added to enhance the properties. Lurol (Goulston) L624 which contains a C4 or C6 fluorocarbon to enhance water and stain resistance, and Lurol (Goulston) 14951 which contains polyphosphinate and other flame retardants to enhance resistance to fire and to reduce smoke. Both additives are enhanced by post process heating to crosslink the additives.

The additional finishes were sprayed on the fibers during blending in a uniform application with the following formula:

| | |
|---|---|
| Lurol L624 | 0.25% on Fiber |
| Lurol 14951 | 0.90% on Fiber by weight |

The blended fibers were carded, cross lapped, and needled on a conventional needle punch line running at 1,500 kg/hour. The fabric was produced at 1,000 grams per square meter at a thickness of 6-7 mm.

The fabric was then placed two layers together in a contact heater at 400° F. or 205° C. for 1 minute. The heated blanks were then place in a cold mold to form a patterned ceiling tile. During development fabric weights from 300 grams per square meter up to 3,500 were evaluated. There appears to be a correlation between weight and sound absorption.

Additional work was performed on a pilot basis to add antimicrobial additives to the fiber during extrusion. Additives included Silver Chloride such as Microban Silver Shield™ and Life Material F/AG-00-1A; Silver Sulfate such as Kodak AgAM100; Silver Zeolites such as AgION® and Alphasan®. Anti-mold, mildew, and fungal additives such as Copper Sulfate and other copper and zinc salts were reviewed. Quaternary Ammonium Salts were also reviewed that could be either added to fiber in extrusion or as a topical treatment. The primary objective was to target Mold, Mildew and fungus in ceiling tiles and acoustic panels which cause concerns in clean applications such as Medical spaces. Further work was done, especially with silver sulfate, to make fibers that would be effective against gram positive and gram negative bacteria such as MRSA.

The use of the PETG (polyethylene gycol) fibers provided significantly better bond of the fiber. The resultant nonwoven did not dust during cutting. Cutting conventional mineral ceiling tiles is very dusty and dirty. This dust causes potential health issues as well as dust in the work space. The tile using PETG cuts easily with a utility knife or very large scissors as well as standard saw blades. Mono-component PETG fibers flow easily at their melt point of 165° C. and chemically and mechanically bond to PET (polyethylene terephalate). PETG polymers are available with melt points from 130° C. to 180° C.

PETG (polyethylene glycol) fibers have a melt point of 160-165° C. and remain completely amorphous. The result is there is a very high heat deformation feature. Typical Bi-Component binder fibers have a melt temperature of the sheath at 110° C. In many architectural applications, the ceiling tiles can be in very high locations where the ceiling temperature can reach 100° C. (212° F.) and the tiles will deform. Tiles made with PETG can withstand 24 hour aging at 150° C. with no deformation. However, other binder fibers could be used such as: Isophthalic modified PET (polyethylene terephalate), polyethylene, polypropylene, co-PLA (poly lactic acid), or polymers with a melting point below the high melt fibers.

While PET fibers were chosen because they are chemically compatible with PETG fibers, other polymers could be chosen including Nylon 6, Nylon 6,6, Polypropylene, Acrylic, PLA, or any thermoplastic polymer with a melt temperature over 120° C. Further, natural fibers such as cotton or wool could be used as the non-binder fibers if suitable treatment for Fire Resistance is provided. Further pigments could be added to these fibers during extrusion to created colored fibers that can be blended to provide aesthetic colors in lieu of printing.

This invention found that Polyphosphinates, such as found in the Americhem 33558-F1, were very successful for low smoke and flame spread. Polyphosphinates are used in PET for children's sleepwear and are considered very safe for people and the environment. Other flame retardants such as organophosphates, phosphonates, antimony trioxide, etc. could be used. There is a wide class of organohalogen compounds that are effective but there are safety and health concerns.

Ceiling tiles in this disclosure can be made with up to 95% recycled content from either post-industrial or post-consumer feed stock. PET water bottle flake was the preferred feed stock for the PET fibers. Reground PETG film such as film made from Eastman type GN071 was used to make the PETG fibers.

The Ceiling tiles or Acoustic panels produced as in this disclosure are 100% recyclable back into fibers that can be used to make new Ceiling tiles. Thus, this process is very environmentally friendly.

The fiber production process that was used to extrude the PET and PETG uses practically zero water. The fibers are drawn in a hot water bath at a temperature of about 75° C. The water is used continually and water in the amount of about 3-5% by weight of fiber leaves the water bath on the fiber. Most of this water is squeezed off during crimping and returned to the hot water bath. The net result is that about 2-3% by weight of water on fiber is evaporated. There is no waste water going to the sewer or other treatment during normal operation.

Since the tiles are made of 100% polyester fibers (PET and PETG), the fabric is printable using sublistatic or transfer printing process. In this process, the inks or dyes are printed on a release paper. The paper and the fabric are placed in a heated press, either stationary or continuous, and the paper and fabric are heated to 180-210° C. The dyes or inks turn to gas and penetrate into the PET fibers. After cooling, the color is permanent on the fabric.

Further, these fabrics could be printed using conventional roller or screen printing methods with inks or dyes.

During the molding process, the molding pattern can be customized to the Customer's requirements. The mold is made from aluminum typically, but could be fiberglass, steel, or any other hard surface. The mold is water-cooled so that the heated fabric takes the shape of the mold. After molding the ceiling tile or acoustic panel is trimmed to the desired size, such as 2'×4' or 2'×2'. A typical ceiling tile with molded features is shown in FIG. 1.

Figure 2:
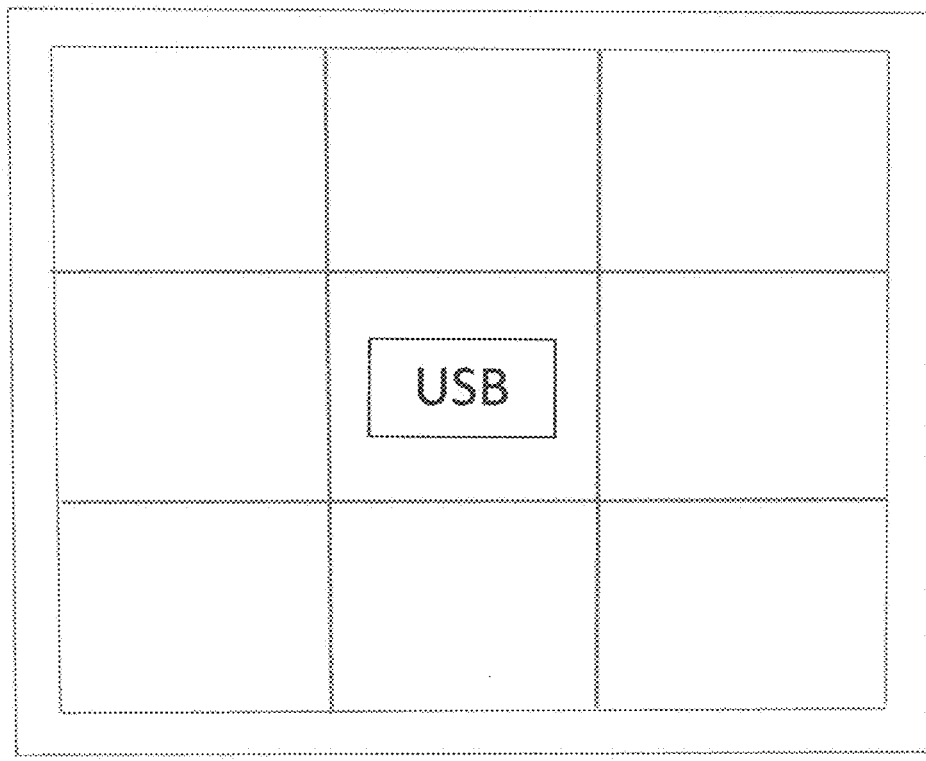
FIG. 2 is an example of the ceiling tile in FIG. 1 including a logo within the ceiling tile.

Because the fabric has a high percentage of low melt temperature fibers, the tile can be embossed with the customer's logo as shown in FIG. 2.

The initial work was done using round fibers. By using fibers of other cross-sections such as triangle, dog-bone, star, hollow, or mock-hollow, a more tortuous path can be created in the fabric to more efficiently absorb sound energy and convert it into heat energy. Possible fiber shapes that have been found to be useful for this purpose include the fiber shapes shown in FIG. 4. The fiber shapes may be used individually or blended together in random fashion. Blends of various fiber shapes have shown to produce a more tortuous path and thus better sound absorption. Further the thickness or denier of the fibers may be used in concert with the shape of the fibers to produce a more tortuous path. In addition the length of the fibers may be varied to further the more tortuous path. All of these factors in addition to the melting of the binder fiber in the interstitial spaces between the fibers add to better sound absorption because of increase in the tortuous path through the nonwoven fabric.

Figure 3:
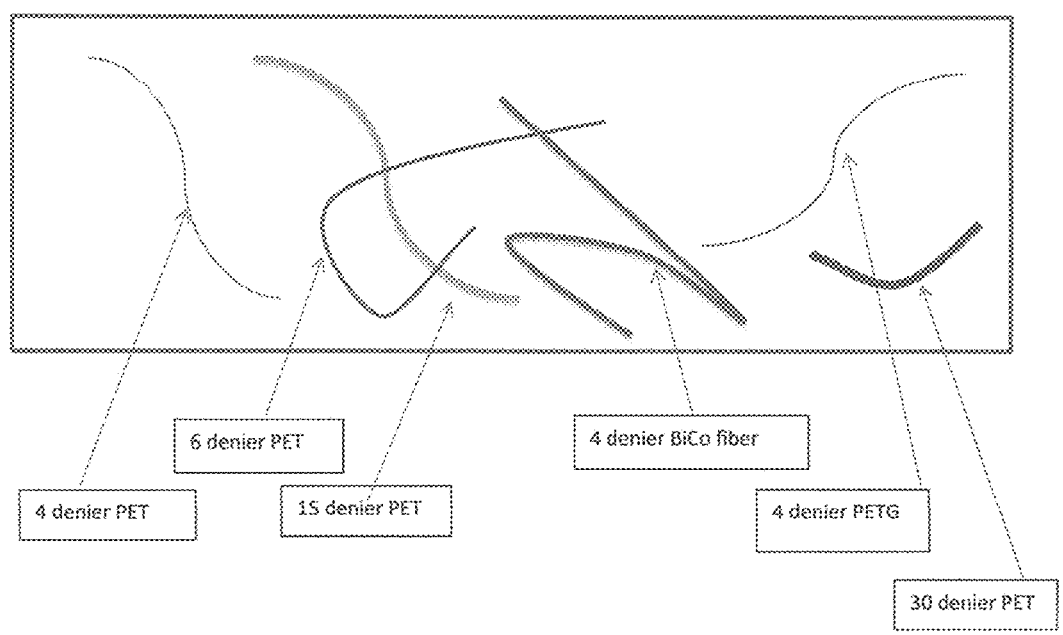
FIG. 3 is a microscopic side view of one embodiment of a fiber composition used in the ceiling tile of FIG. 1 and showing different diameters or deniers of fibers.

As shown in Example 5, fibers of various "deniers" were used. Within a single polymer of comparable specific gravity, denier is directly related to diameter. By choosing fibers of different diameters and length, the sound absorption can be optimized. This is the reverse of the strings on a harp. The small diameter strings produce high notes while the large diameter produces the low notes. Fibers can be readily produced in deniers such as 0.9, 1.5, 2.25, 3.0, 4.5, 6.0, 9.0, 15.0, 20, 25, all the way up to 300. The various diameter fibers affect how the fibers pack together providing the ability to control air flow and hence sound flow. Examples are shown in FIG. 3.

Further, the length of the fiber affects how the fibers pack together. Fibers of different length were shown in Example 5. Common Polyester fiber lengths are 25 mm, 38 mm, 51 mm, 60 mm, 75 mm, and 90 mm, up to 190 mm.

Figure 5:
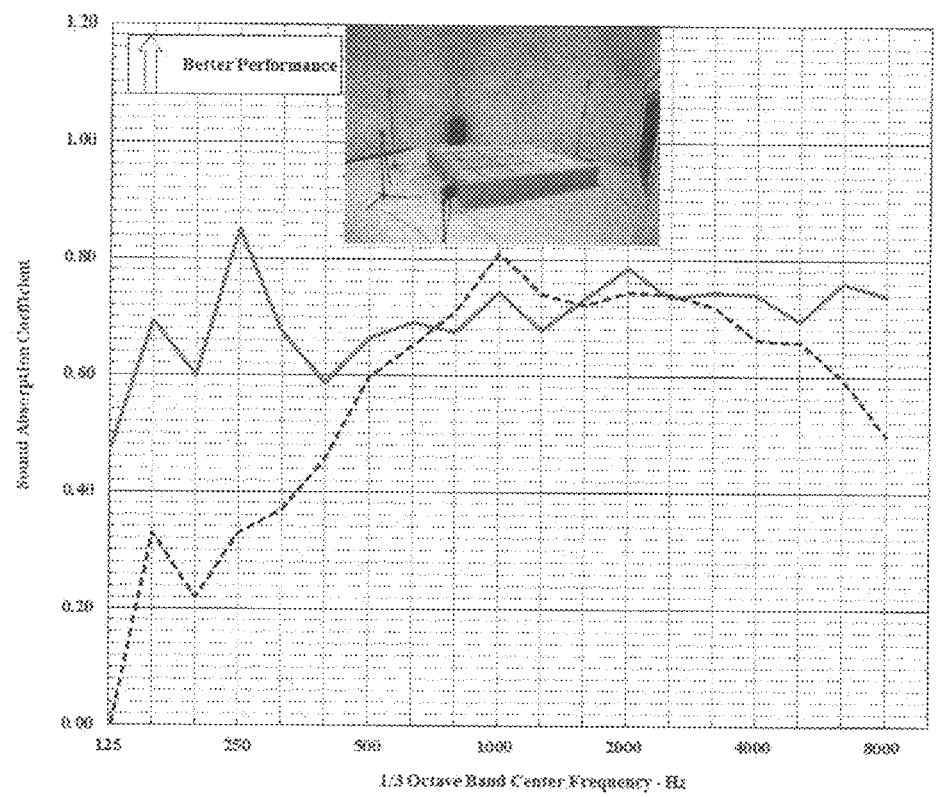
FIG. 5 is a graph showing sound absorption results for samples tested of nonwoven ceiling tile of the present invention vs. conventional Armstrong® Ultima® tile.

The fabric in Example 3 was tested for Random Incidence Absorption Coefficient in a full size Reverberation room in accordance with ASTM C423. The Ceiling tile (NwN) was tested against an industry standard Armstrong Ultima GR1912A which claimed a Noise Reduction Coefficient of 0.70. The tile made from the fabric in 0009 obtained a 0.75 NRC, which is significantly higher. Further, the tile had superior performance in the frequency range of 125-500 hertz and 2,000 to 8,000 hertz. This is shown in FIG. 5.

Ceiling tiles are generally 2'×2' or 2'×4' but these molded nonwoven fabrics can be made in any size from 1'×1' to 10'×10' if the proper press can be use.

Blending a low melt fiber with internal flame resistance with a natural fiber such as: cotton, wool, flax, jute, or hemp allows the use of non-inherent flame resistant fibers to be used in moldable composites. Some of these fibers are naturally resistant to high heat applications, but cannot be used because they burn easily. This eliminates the need to apply topical flame retardants which could cause harmful chemicals to touch the personnel using these moldable tiles and panels. Low melt fibers such as: Polyethylene, Isophthalic modified Polyester, PETG, and co-PLA can be used as the binder fibers to provide stiffness and durability.

Generally there is at least at 10° C. (19° F.) difference in melt temperatures (and usually greater) to allow the low melt fiber to melt and stick to the high melt fibers. PETG fibers that are amorphous typically may have a melt temperature of 160-165° C. Eastman Chemical, SK Chemicals, and Artenius Italia are manufacturers of PETG. Cyclohexane dimethanol (CHDM) can be added to the polymer backbone in place of ethylene glycol. Since this building block is much larger (6 additional carbon atoms) than the ethylene glycol unit it replaces, it does not fit in with the neighboring chains the way an ethylene glycol unit would. This molecular structure interferes with crystallization and lowers the polymer's melting temperature. In general, such PET is known as PETG or PET-G (Polyethylene terephthalate glycol-modified).

Figure 6:
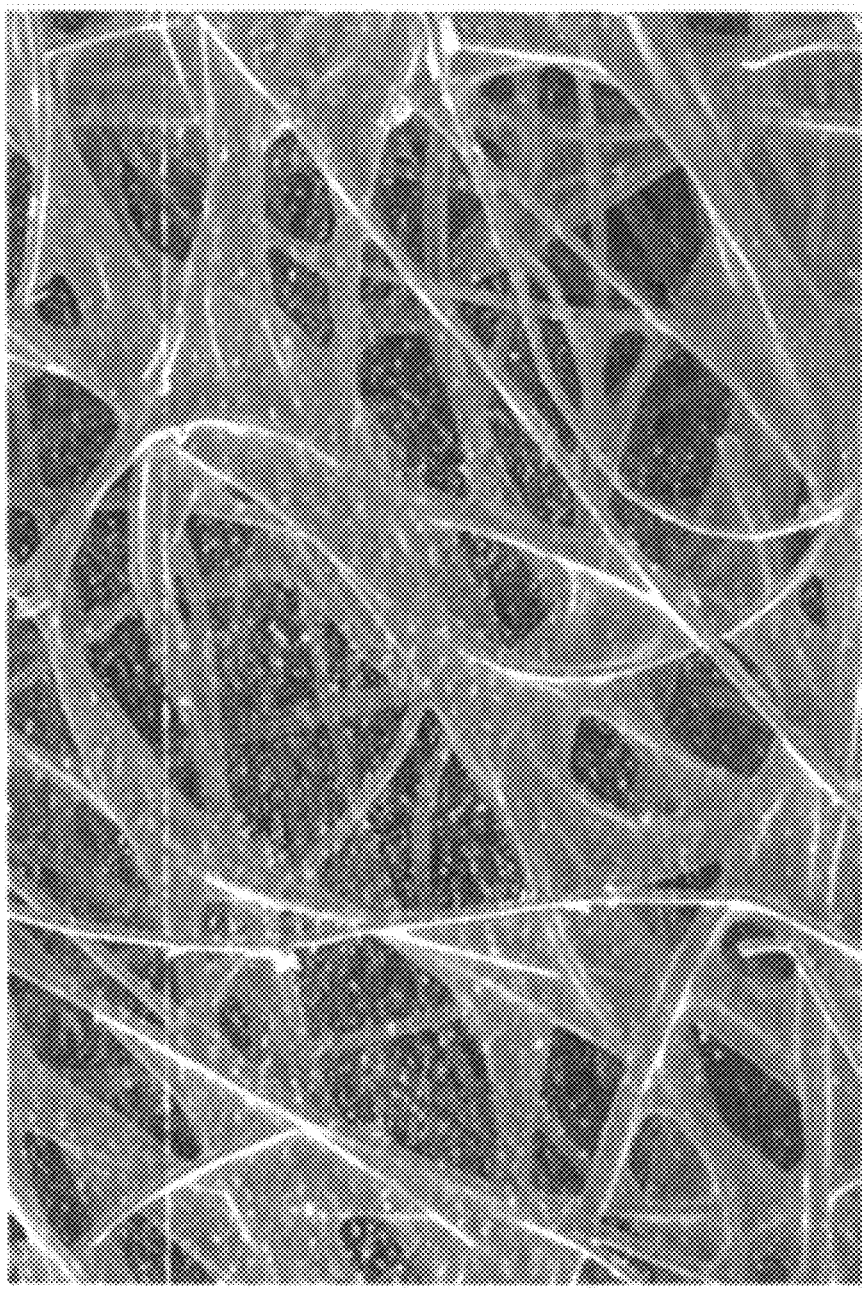
FIG. 6 is a photomicrograph of a nonwoven fabric sample of the present invention showing melted portions of one of the fiber types that decreases interstitial spaces to increase acoustic properties by increasing a tortuous path through the material and increasing sound absorption.

FIG. 6 is a photomicrograph showing the decreased interstitial space or size between fibers in a non-woven material by the melting of one of the two fiber types having the lower melting point. Decreased interstitial space and hence a more tortuous path is attributable to the increased acoustic properties (noise absorption) of the fabric.

Acoustic panels are generally used to decorate wall panels that can be hung in rooms to absorb the sound. Frequently acoustic panels can be hung from ceilings to block and disrupt the flow of sound within a room. Acoustic panels can be used as separators within a room such as work cubicles. Acoustic panels can also be shaped as picture frames or other objects of art to absorb sound within a room.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed:

1. An acoustical ceiling tile or wall panel comprising,
   a plurality of nonwoven synthetic fibers forming a structurally self-supporting nonwoven fabric requiring no supportive substrate, the synthetic fibers consisting of a first fiber type and a second fiber type, and the first and second fiber type having a cross-sectional fiber shape and a fiber length, wherein the fiber shape and the fiber length varies;
   the first fiber type having a low melt fiber and a lower melt temperature than the second fiber type having a high melt fiber, and the first fiber type having a melt temperature from about 110° C. (230° F.) to 165° C. (329° F.) that is melted to form a binder fiber for binding the plurality of nonwoven synthetic fibers and is melted into interstitial spaces between the synthetic fibers to substantially fill interstitial spaces and reduce sound waves from passing through the structurally self-supporting nonwoven fabric forming an acoustical ceiling tile or a panel;
   a tortuous path within the interstitial spaces between the plurality of fibers;
   a flame retardant and a smoke suppressant infused into at least one of the first and second fiber types either before or during formation of the first and second fiber types by an extrusion process; and
   wherein the acoustical ceiling tile or wall panel blocks air and create resistance for sound and wherein the plurality of fibers is recyclable.

2. The acoustical ceiling tile or wall panel in claim 1, wherein polyethylene terephalate (PET) is the second fiber type having a high melt fiber and polyethylene terephalate glycol (PETG) is the first fiber type having a low melt fiber; and wherein the PET is infused with the flame retardant.

3. The acoustical ceiling tile or wall panel in claim 1, wherein the flame retardant and the smoke suppressant are selected from a group consisting of alumina trihydrate $(Al(OH)_3)$, magnesium hydroxide $(Mg(OH)_2)$, Polyphosphinates organophosphates, phosphonates, antimony trioxide, organohalogen compounds, and any combination thereof.

4. The acoustical ceiling tile or wall panel in claim 1, wherein a single acoustical ceiling tile or panel has a dry weight from 300 to 4,000 grams per square meter.

5. The acoustical ceiling tile or wall panel in claim 1, wherein a single acoustical ceiling tile or panel has a thickness from 2 mm to 10 mm.

6. The acoustical ceiling tile or wall panel in claim 1, wherein the second fiber type having the high melt fiber is selected from the group consisting of Nylon 6; Nylon 66; Polylactic acid (PLA); polyethylene terephalate (PET); Acrylic, Polypropylene; Polypropylene blended with at least one of Isophthalic modified PET, Co-Polylactic Acid (Co-PLA), and polyethylene; and any combination thereof.

7. The acoustical ceiling tile or wall panel in claim 1 wherein the first fiber type having the low melt fiber is selected from the group consisting of polyethylene terephalate glycol modified (PETG), Isophthalic modified bi-component, polyethylene, polypropylene, Co-PLA (Co-polylactic acid), Polylactic acid (PLA), and any combination thereof.

8. The acoustical ceiling tile or wall panel in claim 1, further including a topical fiber coating of an additional flame retardant and a fluorochemical for stain resistance.

9. The acoustical ceiling tile or wall panel in claim 1, wherein the synthetic fibers contain a blend of different denier ranging from 0.9 to 300 denier.

10. The acoustical ceiling tile or wall panel in claim 1, wherein the synthetic fibers contain a blend of different lengths ranging from 25 mm to 180 mm.

11. The acoustical ceiling tile or wall panel in claim 1, wherein the synthetic fibers are colored fibers and blended together to achieve an aesthetic appearance.

12. The acoustical ceiling tile or wall panel in claim 1, wherein the ceiling tile or wall panel is printed using sublistatic or transfer printing methods.

13. The acoustical ceiling tile or wall panel in claim 1, wherein the ceiling tile or wall panel is printed using a roller method or screen printing method.

14. The acoustical ceiling tile or wall panel in claim 1, wherein the ceiling tile or wall panel has a customized pattern molded into the nonwoven fabric.

15. The acoustical ceiling tile or wall panel in claim 1, wherein the ceiling tile or wall panel has a custom logo embossed therein.

16. The acoustical ceiling tile or wall panel in claim 1, wherein the synthetic fibers further include an antimicrobial.

17. The acoustical ceiling tile or wall panel in claim 1, wherein the ceiling tile or wall panel has a noise reduction coefficient of 0.50 or greater, and the wall panel is a free hanging acoustical panel.

18. The acoustical ceiling tile or wall panel in claim 1, wherein the synthetic fibers contain a blend of different cross-sectional shapes.

19. The acoustical ceiling tile or wall panel in claim 18, wherein the synthetic fibers contain a blend of different lengths ranging from 25 mm to 180 mm.

* * * * *